Sept. 15, 1970          R. L. EASTMAN          3,528,685
QUICK HITCH ATTACHMENT FOR TRACTORS
Filed Oct. 28, 1968
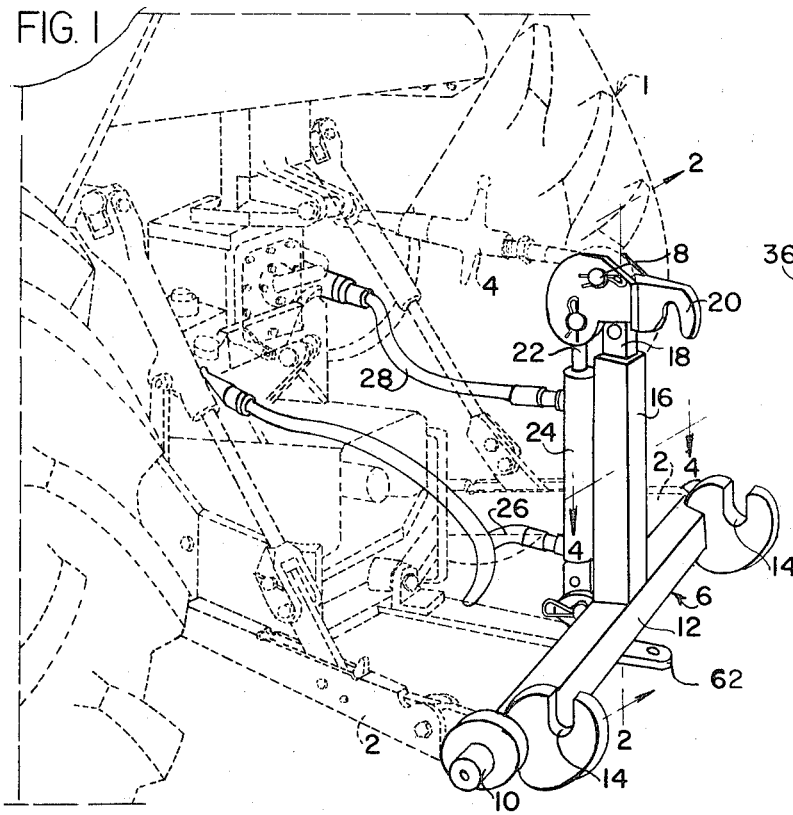
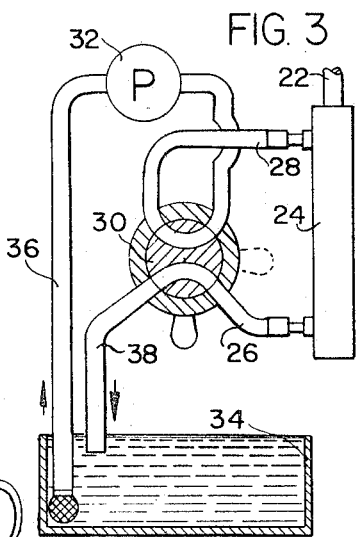
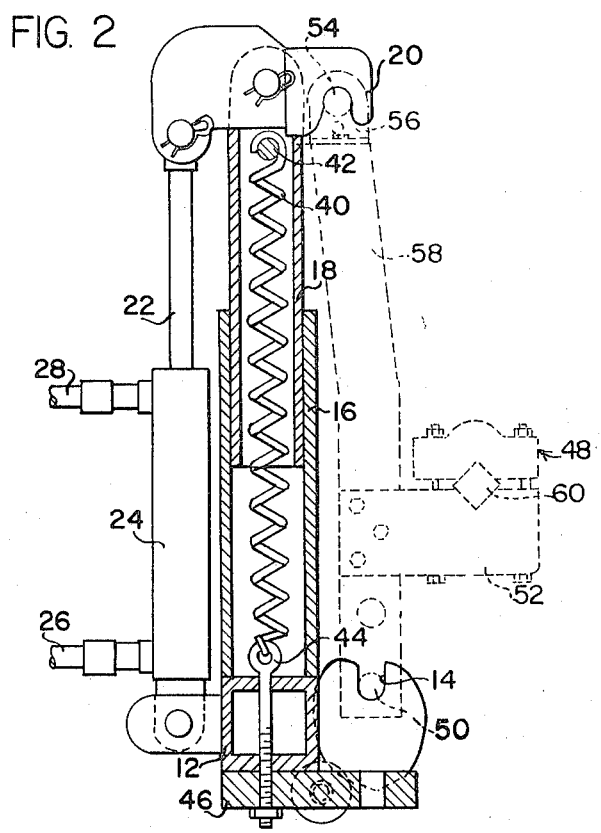
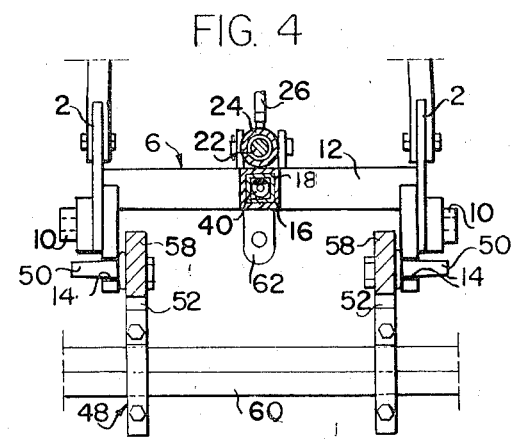
ROBERT L. EASTMAN
*INVENTOR.*
BY
*Wayland D. Keith*
HIS AGENT

United States Patent Office 3,528,685
Patented Sept. 15, 1970

3,528,685
QUICK HITCH ATTACHMENT FOR TRACTORS
Robert L. Eastman, P.O. Box 127, Randlett, Okla. 73562
Filed Oct. 28, 1968, Ser. No. 771,110
Int. Cl. B60d 1/10
U.S. Cl. 280—479   8 Claims

ABSTRACT OF THE DISCLOSURE

A hitch for a tractor having a three-point power lift, which hitch has hooks which may be quickly detached from an implement or trailer by mechanical action on a fluid cylinder, and the hooks of which hitch may be quickly attached to an implement or trailer by spring action so as to enable an implement to be raised and lowered with a three-point hitch in the same manner as if secured thereto by pins or bolts, and which implement or trailer may be readily detached therefrom and attached thereto without manual effort.

---

This invention relates to attachments for three-point lift tractor hitches and more particular to an attachment whereby tools may be attached to, or detached from a tractor, by remote control, without having to use pins, clevices, or the like.

Various attachments for lifts and hitches have been proposed heretofore, but these, for the most part, employed pins, clevices and the like, which required time and effort to connect and disconnect these, as well as danger incident to coupling or uncoupling a load which might be in a strain, and which might cause bodily injury to the person making connections.

The present invention involves the use of a pair of spaced apart upturned hooks on the lower side of the drawbar of the hitch, and a downturned hook on the upper side of the three-point hitch arrangement. The present quick action attachment is hydraulically actuated by a positive spring closing of the hook members against the complementary member being attached thereto.

An object of this invention is to provide a device to enable the quick attachment and detachment of plows, tools, trailers, and the like to a three-point hitch in a minimum of time without the use of pins or the like.

Another object of the invention is to provide a hydraulically actuated attachment means for attaching plows, trailers, and the like, to a three-point hitch, which requires a minimum of manual alignment between the complementary parts to be connected.

Still another object of the invention is to provide a hydraulically actuated mechanism for opening the hitch elements and to provide a positive spring closing mechanism to hold the complementary hitch members in connected relation with an implement, trailer, or the like.

With these objects in mind and others which will become manifest as the description proceeds, reference is to be had to the accompanying drawings, in which like reference characters designate like parts in the several views thereof, in which:

FIG. 1 is a fragmentary perspective view of a tractor, shown in dashed outline, with a three-point hitch thereon, and showing the invention, in full outline, attached to the three-point hitch;

FIG. 2 is a sectional view taken on line 2—2 of FIG. 1, looking in the direction indicated by the arrows, with parts broken away and with parts shown in dashed outline, to show the details of construction;

FIG. 3 is a diagrammatic view of the hydraulic system for actuating the device to engage the implement, trailer, or the like; and FIG. 4 is a sectional view taken on line 4—4 of FIG. 1, looking in the direction indicated by the arrows.

With more detailed reference to the drawing, the numeral 1 designates generally a tractor which has a conventional three-point hitch, which hitch has an outwardly extending drawbar 2 on each side thereof, which bars 2 are connected to the tractor, in a conventional manner, with the upper portion of the hitch and to an adjustable linkage 4 connected thereto.

The present quick connection device, generally designated by the numeral 6, is so constructed as to attach to the distal ends of the bars 2 and to the adjustable linkage 4, as by the respective pins 8 and 10. The present quick connection device 6 has a beam or tubular bar 12 extending between drawbars 2 with an upwardly open throat hook 14 secured to each end of the tubular bar 12. An upstanding guide member 16, which is secured to tubular bar 12, is rectangular in shape and has a smaller rectangular member 18 telescoped thereinto in sliding relation, so the member 18 is held in upright, guided relation upon movement of hook 20 upward, by plunger 22 of the hydraulic cylinder 24. The hydraulic cylinder 24 has hoses 26 and 28 connected thereto and to the hydraulic system of the tractor, which includes a valving mechanism, as is diagrammatically indicated at 30, a pump as indicated at 32, and a reservoir as indicated at 34, with a suction pipe 36 leading from the reservoir and a discharge pipe 38 leading into the reservoir.

The hydraulic system, shown in FIG. 3, is merely representative of a hydraulic system, and is not to be construed as the particular system to be used, other than to show that the cylinder 24 has inlet pipes and outlet pipes which are controlled by hydraulic valving mechanism. The rectangular tubular members 16 and 18 have a tension spring 40 therein, one end of which spring is connected to a transverse pin 42, which passes through the upper portion of rectangular tubular member 18, with the lower end of the tension spring 40 being connected to an eye bolt 44 which passes downward through the tubular bar 12 and drawbar hitch 46.

FIG. 2 discloses how an implement or a trailer is attached to the quick connection device by inturned hooks 14 and 20. The implement being towed, such as indicated generally at 48, has a cross bar or outwardly extending pins 50 on the lower connecting bars 52 and has a transverse pin 54 extending between spaced apart lugs 56, which enables the tractor hitch arrangement, as shown in FIGS. 1 and 2 to engage the pins 50 by hooks 14, then, upon movement of the plunger 22 downward, the rectangular member 18, to which hook 20 is attached, will be moved downward until the hook 20 is in engagement with the pin 54 which is positioned between lugs 56. Upright bars 58 extend between bars 52 and lugs 56, so as to form a rigid frame and to hold the bars 52 and lugs 56 thereon in rigid, spaced apart relation. A transverse tool bar 60 extends between spaced apart bars 52 to hold the bars in fixed, spaced apart relation, and to provide a tool bar for attachment of plow shanks and for the attachment of other tilling implements.

With the hooks 14 and 20 engaged with the pins 50 and 54, the pressure is released from fluid cylinder 24 and the spring 40 will hold the respective hooks 14 and 20 in engaged relation with the respective pins 50 and 54. By raising the power lift, which is a conventional 3-point lift, the bars 2 may be raised, together with the adjustable linkage 4, so the entire implement being trailed or hitched to the tractor 1 can be positioned as desired.

When it is desired to attach an implement or trailer to a tractor having a quick connecting hitch comprising spaced apart upturned hooks 14 and a downturned hook 20, hydraulic fluid pressure is directed from reservoir 34 up through suction line 36 into pump 32 and out through a pipe connected thereto and into 4-way valve 30, with the valve in the position as indicated in dashed outline, fluid will be directed through the valve 30 into conduit 26 into the bottom of cylinder 24 with the fluid within the cylinder 24 being expelled through conduit 28, valve 30 and out through conduit 38 into reservoir 34, so as to cause plunger 22 and hook 20 to move upward against tension of spring 40. With the hook 20 in an elevated position, the tractor is backed into position until pins or transverse bar 50 drops into hooks 14, whereupon, the 4-way valve is moved from the position, as indicated in the dashed outline, to that indicated in full outline in FIG. 3, whereupon hydraulic pressure is applied by pump 32 to the conduit 28, which will move plunger 22 downward, the fluid within cylinder 24 will be discharged out through conduit 26, valve 30 and out of discharge conduit 38, as indicated in full outline in FIG. 3.

With the fluid being discharged from cylinder 24, the hook 20 will come into engagement with pin 54 extending between spaced apart lugs 56, whereupon, the hydraulic pump is rendered inoperative. The spring 40 will then hold the hook 20 in binding engagement with pin 54, which in turn will push cross bar or pins 50 into the bifurcations of the hook, which will connect the implement, or vehicle to be trailed with the tractor, without the human hands having to touch any part of the connections, if the implement or vehicle to be trailed is in proper spaced relation with respect to the terrain. A conventional trailer connection is shown at 62 which may be utilized for vehicles that are not equipped with cross bars or pins 50 and 54, thus the present arrangement is versatile in connecting any type of implement or vehicle to a tractor.

It is to be pointed out that the present arrangement may be readily removed from the conventional 3-point hitch when not in use, or, when it is desired, the tractor may be used without the present 3-point hitch arrangement. FIGS. 1 and 3 disclose the unit substantially in full outline as it constitutes the present invention. The unit is so constructed that it may be readily assembled and disassembled for repair and replacement of parts, as will be evidenced from FIG. 2.

Having thus clearly shown and described the invention, what is claimed as new and desired to be secured by Letters Patent is:

1. A quick detachable hitch mechanism for a tractor having a power lift, which hitch mechanism includes
   (a) a support member associated with said hitch mechanism,
      (1) said hitch mechanism being operatively attached to the tractor,
   (b) a pair of spaced apart implement engaging members on said support member, which implement engaging members extend upward with respect to said support member,
   (c) a member secured to said support member intermediate the ends thereof and upstanding with respect thereto,
   (d) a complementary member engageable with said upstanding member in sliding relation,
   (e) an implement engaging member secured near the top of said complementary engaging member and having a downturned portion thereon, and
   (f) a fluid cylinder-plunger assembly extending between said support member and said implement engaging member near the top of said complementary member, to selectively move said implement engaging members apart when said plunger of said cylinder-plunger assembly is moved in one direction, and to move said implement engaging members toward each other when said plunger is moved in the opposite direction.

2. A quick detachable hitch mechanism for a tractor having a power lift, as defined in claim 1; wherein
   (a) said upstanding member is tubular,
   (b) said complementary member, which is engageable with said upstanding member, is a tubular member, and
      (1) one of said tubular members being telescoped into the other of said tubular members.

3. A quick detachable hitch mechanism for a tractor having a power lift, as defined in claim 2; wherein
   (a) said tubular members are each rectangular in cross-section and are non-rotatable with respect to each other.

4. A quick detachable hitch mechanism for a tractor having a power lift, as defined in claim 2; wherein
   (a) a spring is positioned within said tubular members and is biased therebetween to normally draw one of said tubular members into the other of said tubular members.

5. A quick detachable hitch mechanism for a tractor having a power lift, as defined in claim 2; wherein
   (a) a spring is positioned within said tubular members and is biased therebetween to normally draw one of said tubular members into into the other of said tubular members, and
   (b) said spring is a tension spring, with one end thereof being detachably secured near the upper end of said upstanding tubular member and the lower end of said spring being adjustably secured to said support member.

6. A quick detachable hitch mechanism for a tractor having a power lift, as defined in claim 2; wherein
   (a) a spring is positioned within said tubular members and is biased therebetween to normally draw one of said tubular members into the other of said tubular members, and
   (b) said quick detachable hitch mechanism is detachably secured, by pins, to rearwardly extending bars of the power lift mechanism of the tractor, so the hitch mechanism may be removed as a unit.

7. A quick detachable hitch mechanism for a tractor having a power lift, as defined in claim 2; wherein
   (a) a spring is positioned within said tubular members and is biased therebetween to normally draw one of said tubular members into the other of said tubular members,
   (b) said implement engaging members, which extend upward with respect to said support member, are hooks, which hooks have the throat portion thereof opening upwardly, and
   (c) the downturned portion of said implement engaging member, which is near the top of said complementary member, is a hook which has the throat portion thereof opening downwardly.

8. A quick detachable hitch mechanism for a tractor having a power lift, as defined in claim 2; wherein
   (a) a spring is positioned within said tubular members and is biased therebetween to normally draw one of said tubular members into the other of said tubular members,
   (b) said implement engaging members, which extend upward with respect to said support members, are hooks, which hooks have the throat portion opening upwardly,
   (c) the downturned portion of said implement engaging member, which is near the top of said complementary member, is a hook which has the throat portion thereof opening downwardly, and
   (d) said open throated hooks are adapted to engage, by spring action upon release of fluid pressure from said cylinder, transverse pins positioned near the forward end of the implement to which the tractor is to be hitched.

References Cited

UNITED STATES PATENTS

| | | | |
|---|---|---|---|
| 2,979,137 | 4/1961 | Hess | 172—272 |
| 3,220,751 | 11/1965 | Tweedale | 280—461 |
| 3,312,478 | 4/1967 | Knaapi | 280—479 |
| 3,425,715 | 2/1969 | Weitz | 280—479 |
| 3,427,046 | 2/1969 | Sommer et al. | 280—479 |

FOREIGN PATENTS

| | | |
|---|---|---|
| 249,432 | 9/1966 | Austria. |
| 1,405,179 | 5/1965 | France. |

LEO FRIAGLIA, Primary Examiner

U.S. Cl. X.R.

172—272; 280—461